United States Patent
Chauhan et al.

(10) Patent No.: US 11,558,809 B2
(45) Date of Patent: Jan. 17, 2023

(54) SYSTEM AND METHOD FOR IDENTIFICATION OF AGGRESSOR CELLS

(71) Applicant: JIO PLATFORMS LIMITED, Ahmedabad (IN)

(72) Inventors: Devesh Chauhan, Mumbai (IN); Yashesh Buch, Mumbai (IN); Veera Sai Satyanarayana Prasad Marni, Mumbai (IN); Santhi Swaroop Chinnam, Mumbai (IN)

(73) Assignee: JIO PLATFORMS LIMITED, Ahmedabad (IN)

( * ) Notice: Subject to any disclaimer, the term of this patent is extended or adjusted under 35 U.S.C. 154(b) by 342 days.

(21) Appl. No.: 16/862,443

(22) Filed: Apr. 29, 2020

(65) Prior Publication Data
US 2020/0359305 A1  Nov. 12, 2020

(30) Foreign Application Priority Data
Apr. 30, 2019 (IN) .............................. 201921017269

(51) Int. Cl.
| | |
|---|---|
| H04W 48/16 | (2009.01) |
| H04W 72/04 | (2009.01) |
| H04L 5/00 | (2006.01) |
| H04W 48/08 | (2009.01) |
| H04J 13/00 | (2011.01) |

(Continued)

(52) U.S. Cl.
CPC .......... *H04W 48/16* (2013.01); *H04B 17/318* (2015.01); *H04J 13/0059* (2013.01); *H04L 5/0048* (2013.01); *H04L 5/14* (2013.01); *H04W 48/08* (2013.01); *H04W 72/0446* (2013.01)

(58) Field of Classification Search
CPC . H04W 48/16; H04W 48/08; H04W 72/0446; H04W 24/08; H04W 88/08; H04W 92/20; H04W 72/082; H04W 72/00; H04W 72/04; H04B 17/318; H04J 13/0059; H04J 11/0056; H04J 11/0073; H04J 11/0076; H04J 11/0079; H04J 11/0069; H04J 11/0023; H04L 5/0048; H04L 5/14; H04L 5/1469; H04L 1/00
See application file for complete search history.

(56) References Cited

U.S. PATENT DOCUMENTS

2017/0150496 A1* 5/2017 Xu ............................ H01J 1/02
2019/0342057 A1* 11/2019 Rico Alvarino .. H04W 72/0446

OTHER PUBLICATIONS

ATIS 3GPP 38.866 V 16.1.0 Mar. 2019 (Year: 2019).*

* cited by examiner

Primary Examiner — Rina C Pancholi
(74) Attorney, Agent, or Firm — Klarquist Sparkman, LLP (57) ABSTRACT

A system and method for identifying at least one aggressor cell are described. The method comprises transmitting at least one subframe from at least one base station of a first set of base stations to a second set of base stations, wherein the at least one subframe further comprises of at least one downlink subframe, at least uplink subframe and at least one special subframe. The second set of base stations decodes the at least one received subframe, and maps each of the at least one received downlink subframe, at least one received uplink subframe and at least one received special subframe of the at least one received subframe to at least one expected subframe. Lastly, at least one aggressor cell is determined based on a mismatch of the at least one received subframe and the at least one expected subframe.

15 Claims, 4 Drawing Sheets

(51) Int. Cl.
*H04L 5/14* (2006.01)
*H04B 17/318* (2015.01)

SYSTEM AND METHOD FOR IDENTIFICATION OF AGGRESSOR CELLS

FIELD

The field relates generally to wireless communication networks, and more particularly relates to identification of aggressor cells causing interference facilitated by atmospheric ducting in wireless communication systems.

BACKGROUND

The following description of related art is intended to provide background information pertaining to the field of the invention. This section may include certain aspects of the art that may be related to various features of the present invention. However, it should be appreciated that this section be used only to enhance the understanding of the reader with respect to the present invention, and not as admissions of prior art.

A typical contemporary wireless network is deployed to provide various communication services including, but not limiting to, video, data, advertisement, content, messaging and broadcast. The network has usually multiple access networks to support communications for multiple users by sharing the available network resources. The earlier UTRAN is the radio access network (RAN) defined as part of the Universal Mobile Telecommunications System (UMTS), a third generation (3G) mobile phone technology supported by the 3rd Generation Partnership Project (3GPP). The UMTS technology, which is the successor to Global System for Mobile Communications (GSM) technologies, currently supports various air interface standards, such as W-CDMA, Time Division-Code Division Multiple Access (TDCDMA), and Time Division-Synchronous Code Division Multiple Access (TDSCDMA). Also, the UMTS supports enhanced 3G data communications protocols such as the HSPA that provides higher data transfer speeds and capacity to be associated UMTS networks.

With increase in the demand for mobile data and voice access, these technologies are upgrading not only to meet the growing demand for access but also to enhance the user experience with a user device. One such advanced technology is Evolved Universal Terrestrial Radio Access (E-UTRA) which is a radio access network standard and is considered as a replacement of the UMTS and High-Speed Downlink Packet Access/High-Speed Uplink Packet Access (HSDPA/HSUPA) technologies covered under the 3GPP standards. The Evolved Universal Terrestrial Radio Access (E-UTRA) of the Long-Term Evolution (LTE) is an entirely new air interface system, unlike the High-Speed Packet Access (HSPA), which is unrelated and incompatible with the wireless code division multiple access (W-CDMA). In addition, the E-UTRA not only provides higher data rate and lower latency but is also optimized for packet data. Thus, E-UTRA provides a single evolution path for providing enhancement in the data speeds, and spectral efficiency and allowing the provision of more functionality. The voice services over LTE is referred as VoLTE. The quality of voice through VoLTE is far superior compared to what is provided by legacy networks and termed as High Definition (HD) voice.

Typically, macro network has wide coverage and the cells are deployed at different altitudes depending on the site availability and geographical area. In Time Division Duplexing (TDD) mode, the uplink and downlink operate on the same frequency. Each licensed geographical area has a unique operating frequency, and, so, different areas may have different operating frequencies in same licensed band with overlapped full or partial bandwidth. In TDD-LTE systems, guard period is defined as an interval to switch from downlink to uplink and the duration of this guard period can vary from one OFDM symbol to ten OFDM symbols, thus, spanning a distance of 21 km to 214 km depending on the special subframe configuration. For higher downlink cell throughput, special subframe configuration should be such that it predominantly acts as a downlink subframe.

For instance, if special subframe is configured as 7—containing 10 downlink, 2 uplink and 2 guard symbols. Now, as the Radio signal propagates in space, with two guard symbols, all cells beyond 2×21=42 km from a given cell may experience interference as they would have switched to uplink reception by now. Thus, downlink transmission will cause interference to other cells in uplink beyond the coverage area of around 42 km resulting poor uplink performance and KPI degradation. The interference level (or the transmitting power) also depends on environment and it is observed that uplink KPI degradation is severe during winter season due to Atmospheric Ducting resulting in Time of Flight (ToF) interference where downlink symbol transmission power lasts even after traversing more than 300 km distance in space. This ToF interference is from many aggressor cells from different neighbor cells which are located very far (more than 100 Kms). This results in disruption of services at victim cells.

While existing solutions provides method to resolve the uplink interference caused by user equipment terminals at base station receiver caused due to atmospheric ducting, they teach identifying the atmospheric ducting locations and subsequently modifying the amplitude and phase of the transmitting antenna elements electronically to minimize power transmission into the direction of a duct for resolving the same. Yet another existing solution teaches using antenna-based techniques for interference mitigation, by modifying the transmitting power of the Power Amplifier, such that the signals reaching far-end base stations have sufficiently low power to not cause any significant interference.

The existing solutions particularly fails to provide a solution for interfering terminals and the ducting locations as much as they fail to suggest the objective of detection and identification the interfering aggressor cells specific to Time Division Duplexing Wireless systems only. Therefore, in the view of the limitations of the existing prior art solutions, there arises an imperative need in the art to overcome the limitations of prior existing solutions and to provide a system and a method to detect the aggressor cells causing the interference.

SUMMARY

This section is provided to introduce certain objects and aspects of the present invention in a simplified form that are further described below in the detailed description. This summary is not intended to identify the key features or the scope of the claimed subject matter.

In order to overcome at least a few problems associated with the known solutions as provided in the previous section, an object of the present invention is to provide a method and a system for identifying at least one aggressor cell from a plurality of base stations connected to each other over a wireless communication network. Another object of the present invention is to provide a novel method and a system to detect the aggressor cells causing the interference so that effective interference cancellation mechanism can be adopted to avoid disrupting service to any user on TDD cells, thereby, the cells are able to connect and provide services to the users, hence improving the overall connectivity and user experience of the wireless network. Yet another object of the present invention is to provide a system and a method for automatic detection of aggressor cells and to do away with the manual analysis for detection of aggressor cells. Yet another object of the present invention is to provide a system and a method for detection of aggressor cells, wherein the transmission by an aggressor cell is done sequentially, thus, the probability of decoding the aggressor cell's information at the victim gets higher because of clean Radio Frequency (RF) channel. Yet another object of the present invention is to provide a system and a method for detection of aggressor cells wherein special subframe 7 of victim cell is used for uplink scheduling, thus, the system and the method will not throttle the uplink completely and therefore the user services are not be affected. Yet another object of the present invention is to provide a system and a method for identification of aggressor cells such that the victim cells require very less time duration to scan all the aggressor cells. Yet another object of the present invention is to provide a system and a method for detection of aggressor cells thereby enabling interference mitigation mechanism resulting in higher downlink and uplink cell throughputs, thus improving the customer experience. Yet another object of the present invention is to provide a system and a method to save the battery power by optimizing the connectivity, which will improve the success rate in wireless networks. Yet another object of the present invention is to provide a system and a method to maximize the utilization of available wireless bandwidth. Yet another object of the present invention is to provide a system and a method to handle high volume calls and data concurrently. Yet another object of the present invention is to provide a system and a method for providing users with the features and ability to receive seamless services simultaneously or sequentially consequently without any latency and call drops. Yet another object of the present invention is to provide a system and a method to reduce the probability of failure of service to users and improve the customer experience.

In order to achieve the aforementioned objectives, the present invention provides a method and system for identifying at least one aggressor cell. A first aspect of the present invention relates to a method for identifying at least one aggressor cell from a plurality of base stations connected to each other over a wireless communication network, said plurality of base stations operating on time division duplexing (TDD). The method comprises transmitting at least one subframe from a first set of base stations to a second set of base stations, wherein the at least one subframe is transmitted by at least one base station of the first set of base stations, wherein the at least one subframe further comprises of at least one downlink subframe, at least uplink subframe and at least one special subframe, and wherein the at least one special subframe further comprises of a downlink pilot time slot, an uplink pilot time slot and a guard period. Subsequently, the method encompasses receiving the at least one subframe at the second set of base stations, wherein the at least one subframe is received by at least one base station of the second set of base stations. Next, the method encompasses decoding, at the second set of base stations, each of the at least one downlink subframe, at least uplink subframe and at least one special subframe of the at least one received subframe. Subsequently, the second set of base stations maps each of the at least one received downlink subframe, at least one received uplink subframe and at least one received special subframe of the at least one received subframe to at least one expected subframe. Lastly, the method comprises determining, at the second set of base stations, at least one aggressor cell based on a mismatch of the at least one received subframe and the at least one expected subframe.

Another aspect of the present invention relates to a system for identifying at least one aggressor cell from a plurality of base stations connected to each other over a wireless communication network, said plurality of base stations operating on time division duplexing (TDD). The system comprises a first set of base stations configured to transmit at least one subframe, wherein at least one subframe is transmitted by at least one base station of the first set of base stations, wherein the at least one subframe further comprises of at least one downlink subframe, at least uplink subframe and at least one special subframe, and wherein the at least one special subframe further comprises of a downlink pilot time slot, an uplink pilot time slot and a guard period. The system further comprises of a second set of base stations connected to the first set of base stations, said second set of base stations configured to receive the at least one subframe, wherein the at least one subframe is received by at least one base station of the second set of base stations. The second set of base stations is also configured to decode each of the at least one received downlink subframe, at least one received uplink subframe and at least one received special subframe of the at least one received subframe. The second set of base stations is also configured to map each of the at least one received downlink subframe, at least received uplink subframe and at least one received special subframe of the at least one received subframe to at least one expected subframe. The second set of base stations is further configured to determine at least one aggressor cell based on a mismatch of the at least one received subframe and the at least one expected subframe.

Yet another aspect of the present invention relates to a base station connected to a plurality of other base stations, said base station comprising a memory unit, and a processor connected to the said memory unit. The processor is configured to receive, at least one another subframe, from the plurality of other base stations, wherein the at least one subframe further comprises of at least one downlink subframe, at least uplink, and wherein the at least one special subframe further comprises of a downlink pilot time slot, an uplink pilot time slot and a guard period. subframe and at least one special subframe. The processor is also configured to decode each of the at least one received downlink subframe, at least one received uplink subframe and at least one received special subframe of the at least one received subframe. The processor is further configured to map each of the at least one received downlink subframe, at least received uplink subframe and at least one received special subframe of the at least one received subframe to at least one expected subframe. The processor is also configured to determine at least one aggressor cell based on a mismatch of the at least one received subframe and the at least one expected subframe.

BRIEF DESCRIPTION OF DRAWINGS

The accompanying drawings, which are incorporated herein, and constitute a part of this invention, illustrate exemplary embodiments of the disclosed methods and systems in which like reference numerals refer to the same parts throughout the different drawings. Components in the drawings are not necessarily to scale, emphasis instead being placed upon clearly illustrating the principles of the present invention. Some drawings may indicate the components using block diagrams and may not represent the internal circuitry of each component. It will be appreciated by those skilled in the art that invention of such drawings includes invention of electrical components, electronic components or circuitry commonly used to implement such components.

The foregoing shall be more apparent from the following more detailed description of the invention.

BRIEF DESCRIPTION OF THE EXEMPLARY EMBODIMENTS

In the following description, for the purposes of explanation, various specific details are set forth in order to provide a thorough understanding of embodiments of the present disclosure. It will be apparent, however, that embodiments of the present disclosure may be practiced without these specific details. Several features described hereafter can each be used independently of one another or with any combination of other features. An individual feature may not address all of the problems discussed above or might address only some of the problems discussed above. Some of the problems discussed above might not be fully addressed by any of the features described herein.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As utilized herein, terms "component," "system," "platform," "node," "layer," "selector," "interface," and the like are intended to refer to a computer-related entity, hardware, software (e.g., in execution), and/or firmware. For example, a component can be a process running on a processor, a processor, an object, an executable, a program, a storage device, and/or a computer. By way of illustration, an application running on a server and the server can be a component. One or more components can reside within a process and a component can be localized on one computer and/or distributed between two or more computers.

Further, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software application or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

As used herein, the term "infer" or "inference" refers generally to the process of reasoning about or inferring states of the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action or can generate a probability distribution over states of interest based on a consideration of data and events, for example. Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, magnetic storage devices, e.g., hard disk; floppy disk; magnetic strip(s); optical disk (e.g., compact disk (CD), digital video disc (DVD), Blu-ray Disc™ (BD); smart card(s), flash memory device(s) (e.g., card, stick, key drive).

Moreover, terms like "user equipment" (UE), "mobile station," "mobile subscriber station," "access terminal," "terminal," "handset," "appliance," "machine", and similar terminology refer to a wireless device utilized by a subscriber or user of a wireless communication service to receive and/or convey data associated with voice, video, sound, and/or substantially any data-stream or signaling-stream. Further, the foregoing terms are utilized interchangeably in the subject specification and related drawings. Likewise, the terms "local wireless communications cite," "access point" (AP), "base station," "Node B," "evolved Node B," "home Node B" (HNB), "home access point" (HAP), and the like are utilized interchangeably in the subject specification and drawings and refer to a wireless network component or apparatus that sends and/or receives data associated with voice, video, sound, and/or substantially any data-stream or signaling-stream between a set of subscriber stations—unless context warrants particular distinction(s) among the terms. Further, the data and signaling streams can be packetized or frame-based flows.

Furthermore, the terms "user," "subscriber," "customer," "consumer," "agent,", "owner," and the like are employed interchangeably throughout the subject specification and related drawings, unless context warrants particular distinction(s) among the terms. It should be appreciated that such terms can refer to human entities, or automated components supported through artificial intelligence, e.g., a capacity to make inference based on complex mathematical formulations, that can provide simulated vision, sound recognition, decision making, etc. Also, the terms "local wireless communications site," "access point," "base station," and the like are utilized interchangeably throughout the subject specification and refer to devices that can receive and transmit signal(s) from and to wireless devices through one or more antennas. In addition, the terms "wireless network" and "network" are used interchangeable in the subject application, unless context warrants particular distinction(s) among the terms.

As used herein, a "processor" or "processing unit" includes one or more processors, wherein processor refers to any logic circuitry for processing instructions. A processor may be a general-purpose processor, a special-purpose processor, a conventional processor, a digital signal processor, a plurality of microprocessors, one or more microprocessors in association with a DSP core, a controller, a microcontroller, a low-end microcontroller, Application Specific Integrated Circuits, Field Programmable Gate Array circuits, any other type of integrated circuits, etc. The processor may perform signal coding data processing, input/output processing, and/or any other functionality that enables the working of the system according to the present disclosure. More specifically, the processor or processing unit is a hardware processor.

As used herein, a "transceiver unit" may include at least one of a "transmitter unit" configured to transmit at least one data and/or signals to one or more destination units and a "receiver unit" configured to receive at least one data and/or signals from one or more source units. Also, the "transceiver unit" may further include, any other similar units obvious to a person skilled in the art, required to implement the features of the present invention.

As used herein, "memory unit", "storage unit" and/or "memory" refers to a machine or computer-readable medium including any mechanism for storing information in a form readable by a computer or similar machine. For example, a computer-readable medium includes read-only memory ("ROM"), random access memory ("RAM"), magnetic disk storage media, optical storage media, flash memory devices or other types of machine-accessible storage media.

As used herein, a "controller" or "control unit" includes at least one controller, wherein the controller refers to any logic circuitry for processing instructions. A controller may be a general-purpose controller, a special-purpose controller, a conventional controller, a digital signal controller, a plurality of microcontrollers, at least one microcontroller in association with a DSP core, a microcontroller, Application Specific Integrated Circuits, Field Programmable Gate Array circuits, any other type of integrated circuits, etc. The controller may perform signal coding, data processing, input/output processing, and/or any other functionality that enables the working of the system according to the present disclosure. More specifically, the controller or control unit is a hardware processor that comprises a memory and a processor. The memory is configured to store the modules and the processor is specifically configured to execute said modules to perform one or more processes which are described further below.

As used herein, a "plurality of base stations" may refer to two or more cells which provide a network coverage to a geographic coverage area, thus the geographic area served by the two or more cells is termed as coverage area of the two or more cells. As used herein, a "first set of base stations" may refer to a set of one or more cells formed from the plurality of base stations. Particularly, the "first set of base stations" may refer to one or more cells from the plurality of base stations causing interference facilitated by atmospheric ducting in wireless communication systems. As used herein, a "second set of base stations" may refer to a set of one or more cells formed from the plurality of base stations. Particularly, the "second set of base stations" may refer to one or more victim cells experiencing interference from one or more cells of the first set of base station. As used herein, "affected" may refer to experiencing of interference by one or more victim cells caused by one or more aggressor cells.

Hereinafter, exemplary embodiments of the present disclosure will be described in detail with reference to the accompanying drawings so that those skilled in the art can easily carry out the present disclosure.

Embodiments of the present disclosure may relate to a system and a method for identifying at least one aggressor cell. The subject invention relates to a method and a system for automatic identification of an aggressor cells that may be causing interference to one or more victim cells in order to disrupt service to any user connected to the one or more victim cells. The conventional techniques do not provide the resolution to detect the aggressor cells causing the interference. Compared to such techniques, various methods and apparatus described herein facilitate to detect the aggressor cells causing the interference in a wireless network.

Figure 1:
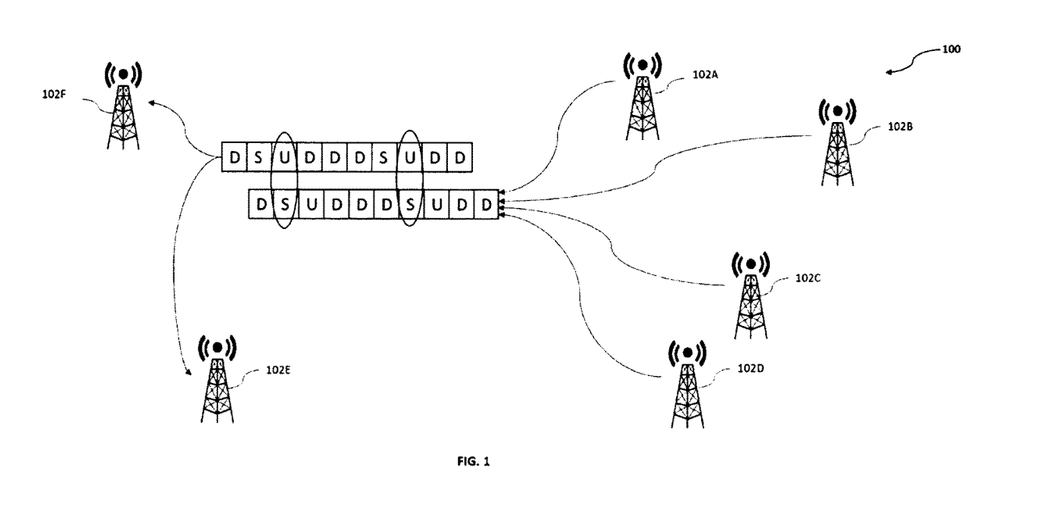
FIG. 1 illustrates an exemplary network architecture diagram [100] depicting a system for identifying at least one aggressor cell, in accordance with exemplary embodiments of the present invention.

Referring to FIG. 1, an exemplary diagram of the network architecture, in accordance with the exemplary embodiment of the present invention. As shown in FIG. 1, the system [100] comprises of a plurality of base stations [102A, 102B, 102C, 102D, 102E, 102F] connected to each other over a wireless communication network. The plurality of base stations [102A, 102B, 102C, 102D, 102E, 102F] are configured to operate on time division duplexing (TDD). Each of the base station may further comprise of a memory unit and a processor connected to the memory unit and working in conjunction to achieve the objectives of the present invention.

The wireless communication network may include a local wireless communication site (or base station), which can use a licensed radio spectrum operated and controlled by a wireless service provider. In another instance of the present invention, the network may be a wired network, a wireless network, or a combination thereof. The network may be a single network or a combination of two or more networks. Further, network provides a connectivity between the plurality of base stations [102A, 102B, 102C, 102D, 102E, 102F]. The invention encompasses that a user device (or a mobile device) operated by a subscriber within a coverage area typically communicates with a core network via the base station. The mobile device can register with the base station and accordingly, the subscriber's communication, e.g., voice traffic, data traffic, can be routed to the subscriber through the base station utilizing the licensed radio spectrum. The base station can employ a backhaul network, e.g., broadband wired or wireless network backbone, to route packet communication, e.g., voice traffic, data traffic, data, to the core network.

The system [100] of the present invention further comprises of a first set of base stations [102A, 102B, 102C, 102D] configured to transmit at least one subframe to a second set of base stations [102E, 102F]. The at least one subframe may be transmitted by at least one base station of the first set of base stations [102A, 102B, 102C, 102D] to the second set of base stations [102E, 102F]. The at least one subframe further comprises of at least one downlink subframe, at least uplink subframe and at least one special subframe. The at least one special subframe further comprises of a downlink pilot time slot, an uplink pilot time slot and a guard period.

For instance, 3GPP has already defined frame structure Type 2 for Time division duplex (TDD). The supported uplink-downlink configurations are listed in below Table 1, where, for each subframe in a radio frame, 'D' denotes the subframe reserved for downlink transmissions, 'U' denotes the subframe reserved for uplink transmissions and 'S' denotes a special subframe.

TABLE 1

ILLUSTRATION OF TYPE 2 FOR TDD SUPPORTED UPLINK-DOWNLINK CONFIGURATIONS

| TDD Con-figuration | Downlink-to-Uplink Switch-point periodicity | Subframe Number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In another instance, the special subframe further comprises of Downlink Pilot Time Slot (DwPTS), Uplink Pilot Time Slot (UpPTS), and a guard period (GP). The DwPTS and UpPTS are always reserved for downlink and uplink transmission in a special subframe separated by a guard period (GP). Depending upon the length of the DwPTS, GP and UpPTS, special subframe configurations are defined and listed below in Table 2:

TABLE 2

ILLUSTRATION OF SPECIAL SUBFRAME CONFIGURATIONS

| Special Subframe Configuration | No. of Symbols in DwPTS | No. of Symbols for GP | No. of Symbols for UpPTS |
|---|---|---|---|
| 0 | 3 | 10 | 1 |
| 1 | 9 | 4 | 1 |
| 2 | 10 | 3 | 1 |
| 3 | 11 | 2 | 1 |
| 4 | 12 | 1 | 1 |
| 5 | 3 | 9 | 2 |
| 6 | 9 | 3 | 2 |

TABLE 2-continued

ILLUSTRATION OF SPECIAL
SUBFRAME CONFIGURATIONS

| Special Subframe Configuration | No. of Symbols in DwPTS | No. of Symbols for GP | No. of Symbols for UpPTS |
|---|---|---|---|
| 7 | 10 | 2 | 2 |
| 8 | 11 | 1 | 2 |

In a preferred instance of the present invention, the invention encompasses utilizing the special-subframe configuration numbered 7 for being the most spectrally efficient special-subframe configuration and allowing a 75% Transport Block (TB) transmission compared to a normal downlink sub-frame. The present invention also encompasses that the special-subframe configuration numbered 7 is followed by each of the plurality of base stations [102A, 102B, 102C, 102D, 102E, 102F] operating on TDD different circles. The invention also encompasses that each of the plurality of base stations [102A, 102B, 102C, 102D, 102E, 102F] in the network are uniquely identified using a global identity known as E-UTRAN Cell Global Identifier (ECGI). Accordingly, each of the plurality of base stations [102A, 102B, 102C, 102D, 102E, 102F] in the network is configured to broadcast its ECGI information through System Information Block 1 (SIB1) message. The other messages broadcasted by each of the plurality of base stations [102A, 102B, 102C, 102D, 102E, 102F] in the network carrying basic information defined by 3GPP for LTE are Synchronization signals (PSS and SSS), MIB and other SIB messages.

For instance, the present invention encompasses that the first set of base stations [102A, 102B, 102C, 102D] (potential aggressor cells) may use the special subframe of the at least one subframe for the transmission of E-UTRAN Cell Global Identifier (ECGI) and symbol number as payload. Particularly, the present invention encompasses that the downlink pilot time slot of the at least one special subframe comprises E-UTRAN Cell Global Identifier (ECGI) for at least one base station of the first set of base stations [102A, 102B, 102C, 102D]. The present invention encompasses that, for the special-subframe configuration numbered 7, the transmission will be repeated across all 10 DwPTS Downlink symbols with symbol number incrementing in every symbol from 1 to 10. The present invention also encompasses that no user equipment shall be scheduled in downlink in this special sub-frame (SF 1) during the said transmission.

The invention further encompasses that the at least one subframe is received at the second set of base stations [102E, 102F], wherein the at least one subframe may be received by at least one base station of the second set of base stations [102E, 102F]. In this regard, the present invention encompasses that the at least one subframe may be received at one or more base stations of the second set of base stations [102E, 102F]. The second set of base stations [102E, 102F] are then configured to decode each of the at least one downlink subframe, at least uplink subframe and at least one special subframe of the at least one received subframe. For instance, the second set of base stations [102E, 102F] decodes the downlink pilot time slot of the at least one received special subframe to identify the at least one base station of the first set of base stations [102A, 102B, 102C, 102D] associated with the ECGI. In another instance, the present invention encompasses that the second set of base stations [102E, 102F] may receive the at least one subframe in the 2 UpPTS symbols of the special sub-frame (SF 1) and the next uplink subframe (SF 2). The second set of base stations [102E, 102F] then decodes the ECGI values and may, alternatively, measure the signal strength to assess the extent of interference from one or more potential aggressor cells.

The present invention also encompasses that no user equipment shall be scheduled in uplink in the special subframe (SF 1) and the next uplink subframe (SF 2) the second set of base stations [102E, 102F]. The user equipment may be scheduled in another uplink subframe (SF 7). Since subframe 7 of the one or more base stations of the second set of base stations [102E, 102F] is still being used for uplink scheduling, the present invention is particularly advantageous as it shall not throttle the uplink completely and therefore will have no service impact. The present invention further encompasses that in order to increase the detection probability of inter circle aggressor cells, there is a need to ensure that the intra circle interference is minimal. Accordingly, the present invention encompasses that the one or more base stations of the second set of base stations [102E, 102F] implements DwPTS blanking in the special subframe (SF1), and accordingly, the one or more base stations of the second set of base stations [102E, 102F] operate in a DwPTS blanking mode. As used herein, "blanking" refers to no transmission in the data Resource Elements (REs). Accordingly, as used herein "DwPTS blanking mode" refers to an operating mode for the base station wherein the 10 downlink symbols of the special subframe called as DwPTS are completely blanked.

The present invention further encompasses that the transmission from the first set of base stations [102A, 102B, 102C, 102D] will be done by one cell at a time to the second set of base station [102E, 102F] in one special subframe in each frame of 10 ms, in a round-robin fashion so that one or more receiving base station of the second set of base station [102E, 102F] are able to decode the signature (ECGI) of one or more base stations of the first set of base stations [102A, 102B, 102C, 102D] individually and measure the extent of interference. However, all the base stations of the second set of base station [102E, 102F] will receive the transmission from one or more base stations of the first set of base stations [102A, 102B, 102C, 102D] simultaneously so that the interference is measured at all cells of the second set in one go. Since the receiver is decoding each symbol of DwPTS and the interference is measured on each symbol individually, it will allow identification of the exact number of interfered symbols in uplink along with the per symbol interference power. The present invention is particularly advantageous as the transmission by one or more base stations of the first set of base stations [102A, 102B, 102C, 102D] is done sequentially, thus, the probability of decoding the aggressor cell's information at the victim is higher because of clean RF channel. Assuming that there are 6600 cells in aggressor cell circle, if one cell is scheduled for transmission in one special sub-frame in a 10 ms frame, it would take about 66 seconds for one round of transmissions. With 20 repetitions, it would take 66×20=1320 seconds=22 minutes. Therefore, this process can be done in the lean hours in night and would be over in 22 minutes without causing any noticeable impact to customers and may not require any downtime.

The second set of base stations [102E, 102F] are also configured to map each of the at least one received downlink subframe, at least one received uplink subframe and at least one received special subframe of the at least one received subframe to at least one expected subframe. For instance, at the second set of base stations [102E, 102F], to enable the receiver with start-of-transmission time information, the ECGI and Symbol payload will be preceded by at least one synchronization sequence in each symbol. The at least one synchronization sequence may comprise of a first synchronization signal and a second synchronization signal. In an instance of the present invention, the first synchronization signal is a primary synchronization signal (PSS) and the second synchronization signal is a secondary synchronization signal (SSS), or any other synchronization signal similar to PSS and SSS as deemed suitable to a person skilled in the art. Therefore, the transmission of synchronization sequence shall be mapped to first six physical resource blocks (PRBs) while the ECGIs and Symbol information will be mapped to the remaining PRBs (except for subcarriers carrying SSS and RS necessary for maintaining service continuity in one or more base stations of the first set of base stations [102A, 102B, 102C, 102D]. The present invention further encompasses that the said process is implemented using Quadrature Phase Shift Keying (QPSK) and lowest possible coding rate.

The second set of base stations [102E, 102F] are then configured to determine at least one aggressor cell based on a mismatch of the at least one received subframe and the at least one expected subframe. For instance, at the one or more base stations of the second set of base stations [102E, 102F] may determine that since the carrier frequencies of aggressor and victim cells are not identical, at least one of the first set of base stations [102A, 102B, 102C, 102D] is identified as an aggressor cell based on the mismatch of carrier frequencies of aggressor and victim cells.

The present invention further encompasses that the second set of base stations [102E, 102F] may measure an interference level for each of the at least one received subframe based on a mismatch of the at least one received subframe and the at least one expected subframe. For instance, in order to measure the exact interference in overlapping bandwidths, the transmission may be done such that the mapping of synchronization sequence and payload is aligned to the overlapping subcarriers in the two circles.

In an alternate instance, the present invention encompasses that at least one orthogonal channel noise sequence (OCNS) is received in the downlink pilot time slot of the at least one special subframe from the first set of base stations [102A, 102B, 102C, 102D]. As used herein, "orthogonal channel noise sequence (OCNS)" may refer to a data Resource Elements (REs) in the special subframe being fed with random noise like sequence, generated by an Orthogonal Channel Noise Simulator, such that all data REs are occupied and the transmit power in maximum. The present invention encompasses that the one or more base stations of the first set of base stations [102A, 102B, 102C, 102D] may transmit an OCNS in all the 10 DwPTS symbols of the special subframe. The said transmission shall take place in a round robin manner for 10 continuous frames i.e., first cell will transmit in a first Special sub-frame of each 10 contiguous radio frames and second cell will transmit in a first Special sub-frame of each next 10 contiguous radio frames and soon. At any time only one cell will transmit the OCNS in all the downlink symbols of Special sub-frame (Sub frame #1). In this way around 36,000 cells can transmit sequence/OCNS in 1 hour.

In the said alternate instance, the present invention encompasses to do away with the decoding of the at least one subframe transmitted by the at least one of the first set of base stations [102A, 102B, 102C, 102D] as at any time there will be only one transmitting cell in DwPTS. For example, the present instance encompasses using the first special subframe in the one or more base stations of the first set of base stations [102A, 102B, 102C, 102D] for sequence transmission and first uplink subframe in the one or more base stations of the second set of base stations [102E, 102F] to measure a received signal strength (RSSI) in every radio frame such that the second special subframe in the one or more base stations of the first set of base stations [102A, 102B, 102C, 102D] and second uplink subframe in the one or more base stations of the second set of base stations [102E, 102F] can still be used for services in every radio frame.

The present invention further encompasses that since in first uplink subframe even though user equipment scheduled in the Physical Uplink Shared Channel (PUSCH) are suspended, there are two other channels, namely, Physical Random Access Channel (PRACH) and Physical Uplink Control Channel (PUCCH) which still needs to be processed. Thus, in order to avoid PRACH processing in first uplink subframe, the one or more base stations of the second set of base stations [102E, 102F] are configured such that PRACH occasions occur only in second uplink subframe. Resultantly, on the other hand, PUCCH processing shall be continued at the first uplink subframe, and the interference measurements shall be restricted to a bandwidth excluding PUCCH resource allocation.

Figure 4:
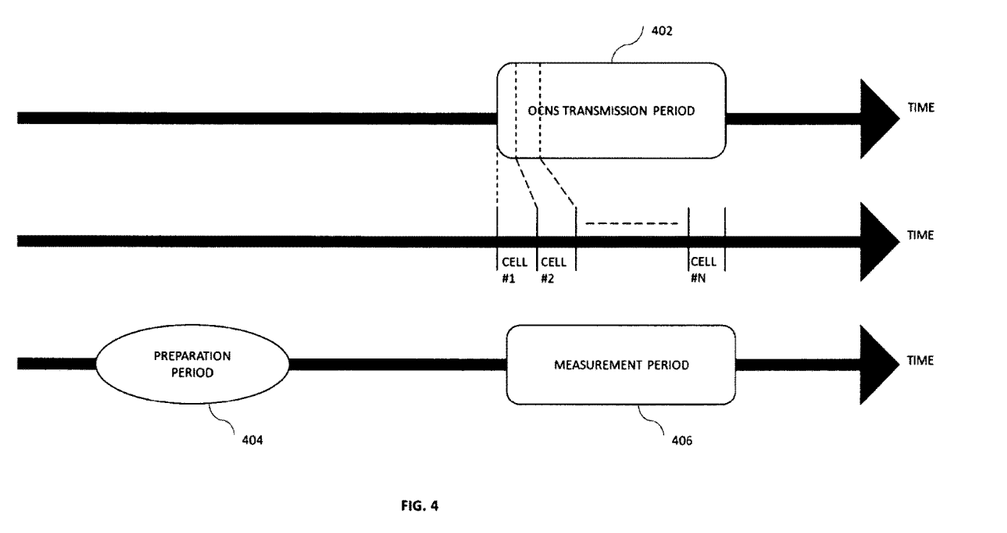
FIG. 4 illustrates an illustrative diagram of an alternate embodiment of method for identifying at least one aggressor cell, in accordance with exemplary embodiments of the present invention.

The present invention further encompasses that, at the second set of base stations [102E, 102F], a floor signal strength indicator is determined during a preparation period, wherein the preparation period is indicative of a time period before receiving of the at least one subframe at the second set of base stations [102E, 102F], and wherein the first set of base stations [102A, 102B, 102C, 102D] are operating in a downlink pilot time slot blanking mode. As used herein, "blanking" refers to no transmission in the data Resource Elements (REs). Accordingly, as used herein "DwPTS blanking mode" refers to an operating mode for the base station wherein the 10 downlink symbols of the special subframe called as DwPTS are completely blanked. In the preparatory period the victim cells are operating in the DwPTS blanking mode such that the power of the DwPTS symbols is minimum and, accordingly, the RSSI measured at the victim cells during the preparatory period will be a baseline value (or floor value) which can be compared with the value that is measured when all DwPTS symbols transmit OCNS. For instance, as also shown in FIG. 4, the present invention encompasses a preparatory period [404] of minimum 15 minutes wherein the one or more base stations of the first set of base stations [102A, 102B, 102C, 102D] may operate in DwPTS blanking mode. The RSSI measurements in one or more base stations of the second set of base stations [102E, 102F] measured during the 15 minutes duration shall be considered as the "floor" value (pre-value or expected value) of interference which may be caused by one or more base stations of the first set of base stations [102A, 102B, 102C, 102D]. In order to ensure the floor value is more reliable, the present invention encompasses minimizing the intra circle interference during the measurement period, and that one or more base stations of the second set of base stations implement DwPTS blanking in first special subframe during this period.

Accordingly, after the prepatory period is over, the one or more base stations of the second set of base stations [102E, 102F] are configured to a measure a received signal strength indicator (RSSI) for the at least one received orthogonal channel noise sequence in a measurement period. For instance, the one or more base stations of the second set of base stations [102E, 102F] will measure RSSI and IOT on every first uplink subframe of a radio frame for a duration of measurement period. Each of the one or more base stations of the second set of base stations [102E, 102F] may then average the measured RSSI and IOT for a contiguous 10 Radio frames for each of the one or more base stations of the first set of base stations [102A, 102B, 102C, 102D]. The present invention encompasses that the measured RSSI shall consider the entire bandwidth except PUCCH PRB's.

The second set of base stations [102E, 102F] are then configured to compare the calculated RSSI to a floor signal strength indicator for each of the at least one of the plurality of base stations. For instance, if the measured RSSI for a particular cell of the one or more base stations of the first set of base stations [102A, 102B, 102C, 102D] is greater than "Threshold" dB (e.g. 3 dB) compared to the "floor" value measured during preparatory period, then that cell can be flagged as one of the aggressor cells.

The second set of base stations [102E, 102F] are then configured to be map the one or more base stations of the second set of base stations [102E, 102F] against the one or more base stations of the first set of base stations [102A, 102B, 102C, 102D] based on the comparison. And, accordingly, the second set of base stations [102E, 102F] are then configured to identify the at least one of the first set of base stations [102A, 102B, 102C, 102D] as at least one aggressor cell based on the mapping. The at least one base station of the first set of base stations [102A, 102B, 102C, 102D] is identified as the at least one aggressor cell based on a number of base stations affected by the at least one of the first set of base stations [102A, 102B, 102C, 102D].

For instance, when the one or more base stations of the second set of base stations [102E, 102F] have measured the RSSI/IOT for all cells in the one or more base stations of the first set of base stations [102A, 102B, 102C, 102D], a matrix of aggressor vs. victim may be created by post processing the measurements on a centralized server. Shown below is an exemplary matrix of Aggressor vs. Victim as Table 2, wherein the cells in aggressor circle (first set of base stations [102A, 102B, 102C, 102D]) that are impacting the maximum cells in victim circle, e.g. Cell 1, 2 and n in above table (the second set of base stations [102E, 102F]) are determined as at the at least one aggressor cell, and can be considered for physical optimization or power reduction to check if the interference on victim cell is reduced.

TABLE 2

ILLUSTRATION OF AGGRESSOR
Vs. VICTIM CELL MATRIX

| | Aggressor Cell #1 | Aggressor Cell #2 | Aggressor Cell #3 | ... | Aggressor Cell #N |
|---|---|---|---|---|---|
| Victim Cell #1 | | | | | |
| Victim Cell #2 | | | | | |
| Victim Cell #3 | | | | | |
| Victim Cell #4 | | | | | |
| . | | | | | |
| . | | | | | |
| . | | | | | |
| . | | | | | |
| Victim Cell #M | | | | | |

In yet another instance, the present invention encompasses that at least one constant amplitude zero auto correlation (CAZAC) sequence is received in the downlink pilot time slot of the at least one received downlink subframe from the at least one of the first set of base stations [102A, 102B, 102C, 102D]. As used herein, "constant amplitude zero auto correlation (CAZAC) sequence" may refer to a periodic complex-valued signal with modulus one and out-of-phase periodic (cyclic) autocorrelations equal to zero, for example, Zadoff-Chu sequences are CAZAC sequences with special properties. The present invention encompasses that the CAZAC sequence is pre-mapped to a cell identifier of the at least one of the plurality of base stations. The present invention further encompasses that the one or more base stations of the first set of base stations [102A, 102B, 102C, 102D] will transmit the CAZAC sequence in 10 DwPTS symbols in special subframe. Each of the one or more base stations of the first set of base stations [102A, 102B, 102C, 102D] will transmit a unique CAZAC sequence pre-mapped to their ECGI. This sequence is repeated across all 10 DwPTS Downlink symbols. The present invention further encompasses that no user equipment shall be scheduled in downlink in this special sub-frame (SF 1). The sequence shall span across the entire system bandwidth (except for subcarriers carrying SSS and RS necessary for maintaining service continuity in aggressor cells). Accordingly, the present invention encompasses that the one or more base stations of the second set of base stations [102E, 102F] will receive this transmission in the 2 UpPTS symbols of the special sub-frame (SF 1) and the next uplink subframe (SF 2).

The second set of base stations [102E, 102F] are configured to decode the at least one received CAZAC sequence to identify the at least one of the plurality of base stations associated with the cell identifier. The one or more base stations of the second set of base stations [102E, 102F] are then configured to calculate a received signal strength indicator (RSSI) for the at least one received CAZAC sequence based on the cell identifier of the at least one base station of the first set of base stations [102A, 102B, 102C, 102D]. For instance, the one or more base stations of the second set of base stations [102E, 102F] are configured to decode the CAZAC sequence mapping to the known ECGI and measure the signal strength to assess the extent of interference from respective one or more base stations of the first set of base stations [102A, 102B, 102C, 102D]. The present invention further encompasses that no user equipment shall be scheduled in the uplink in the special sub-frame (SF 1) and the next uplink subframe (SF 2). The user equipment may be scheduled in another uplink subframe (SF 7).

Since the CAZAC sequences are orthogonal, the one or more base stations of the first set of base stations [102A, 102B, 102C, 102D] shall perform simultaneous transmission without causing interference at the one or more base stations of the second set of base stations [102E, 102F]. The receiver at the one or more base stations of the second set of base stations one or more base stations of the second set of base stations [102E, 102F] can decode various sequences and identify the ECGIs of dominant one or more base stations of the first set of base stations [102A, 102B, 102C, 102D] within a period of 1 ms. However, as the number of available resource elements in a symbol depends on DL Bandwidth, the present invention encompasses that the length of the CAZAC sequence is restricted because of which the transmission can be scheduled batch wise. For instance, in 10 MHz there are 600 sub-carriers out of which if 500 sub-carriers can be used for CAZAC sequences, only 500 cells can simultaneously transmit.

The present invention further encompasses a base station connected to a plurality of said base stations, said base station comprising a memory unit, a communication unit and a processor. The processor is connected to the memory unit, and configured to receive, at least one another subframe, from the plurality of other base stations via the communication unit.

The processor is also configured to transmit, to the plurality of other base stations, at least one another subframe, wherein the at least one another subframe further comprises of at least one downlink subframe, at least uplink subframe and at least one special subframe. The processor is further configured to decode each of the at least one received downlink subframe, at least one received uplink subframe and at least one received special subframe of the at least one received subframe. For instance, the processor decodes the downlink pilot time slot of the at least one received special subframe to identify the at least one base station associated with the ECGI.

The processor is further configured to map each of the at least one received downlink subframe, at least received uplink subframe and at least one received special subframe of the at least one received subframe to at least one expected subframe.

The processor is further configured to determine at least one aggressor cell based on a mismatch of the at least one received subframe and the at least one expected subframe. The processor determines the at least one of the base stations is an aggressor cell in an event the downlink pilot time slot of the at least one received special subframe is received at the uplink pilot time slot of the at least one expected special subframe. The processor is further configured to measure an interference level for each of the at least one received subframe based on a mismatch of the at least one received special subframe and the at least one expected special subframe.

Although FIG. 1 shows a limited number of base stations and exemplary components of the base station, in other embodiments, the network may contain additional and any number of base stations, differently arranged, or with additional components than depicted in FIG. 1. Alternatively, or additionally, one or more components of the network node may perform one or more other tasks described as being performed by one or more other components of the network node.

Figure 2:
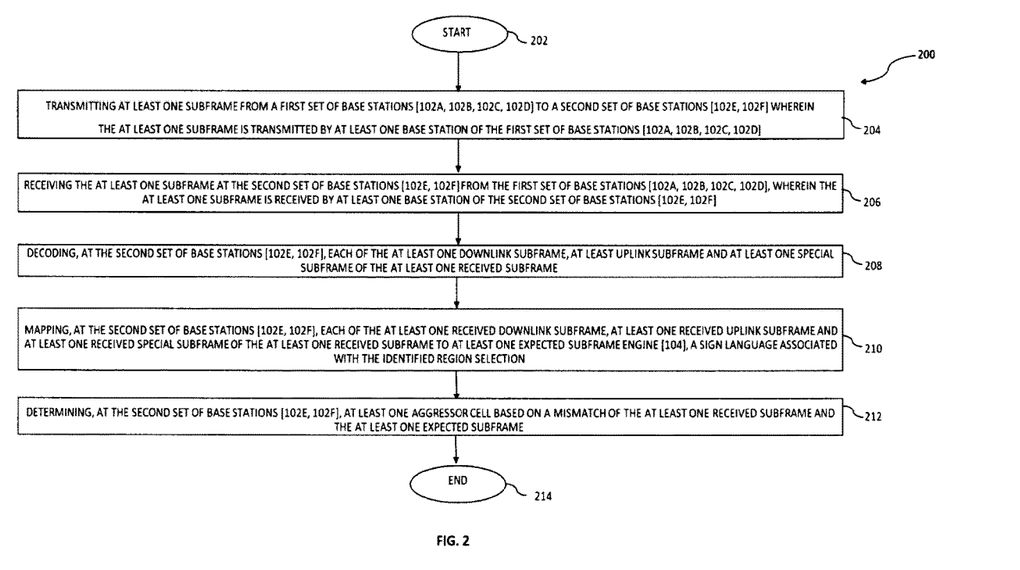
FIG. 2 illustrates an exemplary method flow diagram [200], depicting a method for identifying at least one aggressor cell, in accordance with exemplary embodiments of the present invention.

Referring to FIG. 2, illustrates an exemplary method flow diagram [200], depicting a method for identifying at least one aggressor cell, in accordance with exemplary embodiments of the present invention. The method begins at step [202]. The method comprises, at step [204], that at least one subframe is transmitted from a first set of base stations [102A, 102B, 102C, 102D] to a second set of base stations [102E, 102F], wherein the at least one subframe further comprises of at least one downlink subframe, at least uplink subframe and at least one special subframe. The at least one subframe may be transmitted by at least one base station of the first set of base stations [102A, 102B, 102C, 102D] to the second set of base stations [102E, 102F]. The at least one special subframe further comprises of a downlink pilot time slot, an uplink pilot time slot and a guard period. The present invention encompasses that one or more base stations of the first set of base stations [102A, 102B, 102C, 102D] may use the special subframe of the at least one subframe for the transmission of E-UTRAN Cell Global Identifier (ECGI) and symbol number as payload. Particularly, the downlink pilot time slot of the at least one special subframe may comprise E-UTRAN Cell Global Identifier (ECGI) for at least one base station of the first set of base stations [102A, 102B, 102C, 102D]. The present invention further encompasses that, for the special-subframe configuration numbered 7, the transmission will be repeated across all 10 DwPTS Downlink symbols with symbol number incrementing in every symbol from 1 to 10. The present invention also encompasses that no user equipment shall be scheduled in downlink in this special sub-frame (SF 1) during the said transmission.

The method of the present invention further encompasses that the transmission from the one or more base stations of the first set of base stations [102A, 102B, 102C, 102D] will be done by one cell at a time to the second set of base station [102E, 102F] in one special subframe in each frame of 10 ms, in a round-robin fashion so that receiving base stations of the second set of base stations [102E, 102F] are able to decode the signature (ECGI) of one or more base stations of the first set of base stations [102A, 102B, 102C, 102D] individually and measure the extent of interference. However, all the base stations in the victim circle will receive the transmission from the one or more base stations of the first set of base stations [102A, 102B, 102C, 102D] simultaneously so that the interference is measured on all cells in one go. Since the receiver is decoding each symbol of DwPTS and the interference is measured on each symbol individually, it will allow identification of the exact number of interfered symbols in uplink along with the per symbol interference power.

At step [206], the at least one subframe is received at the second set of base stations [102E, 102F] from the at least one base station of the first set of base stations [102A, 102B, 102C, 102D]. The at least one subframe may be received at one or more base stations of the second set of base stations [102E, 102F]. For instance, the present invention encompasses that the second set of base stations [102E, 102F] may receive the at least one subframe in the 2 UpPTS symbols of the special sub-frame (SF 1) and the next uplink subframe (SF 2). The at least one subframe comprises one of a first synchronization signal, a second synchronization signal, a master information block (MIB), a system information block (SIB), a symbol number and an E-UTRAN Cell Global Identifier (ECGI).

At step [208], the one or more base stations of the second set of base stations [102E, 102F] decodes each of the at least one received downlink subframe, at least received uplink subframe and at least one received special subframe of the at least one received subframe. The present invention further encompasses that the one or more base stations of the second set of base stations [102E, 102F] measures an interference level for each of the at least one received subframe. For instance, the one or more base stations of the second set of base stations [102E, 102F] decodes the downlink pilot time slot of the at least one received special subframe to identify the at least one base station of the first set of base stations [102A, 102B, 102C, 102D] associated with the ECGI. In another instance, the second set of base stations [102E, 102F] then decodes the ECGI values and may, alternatively, measure the signal strength to assess the extent of interference from one or more potential aggressor cells.

At step [210], the one or more base stations of the second set of base stations [102E, 102F] maps each of the at least one received downlink subframe, the at least one received uplink subframe and the at least one received special subframe of the at least one received subframe to at least one expected subframe. For instance, at the one or more base stations of the second set of base stations [102E, 102F], to enable the receiver with start-of-transmission time information, the ECGI and Symbol payload will be preceded by at least one synchronization sequence in each symbol. The at least one synchronization sequence may comprise of a first synchronization signal and a second synchronization signal.

In an instance of the present invention, the first synchronization signal is a primary synchronization signal (PSS) and the second synchronization signal is a secondary synchronization signal (SSS), or any other synchronization signal similar to PSS and SSS as deemed suitable to a person skilled in the art. Therefore, the transmission of synchronization sequence shall be mapped to first six physical resource blocks (PRBs) while the ECGIs and Symbol information will be mapped to the remaining PRBs (except for subcarriers carrying SSS and RS necessary for maintaining service continuity in aggressor cells. The present invention further encompasses that the said process is implemented using Quadrature Phase Shift Keying (QPSK) and lowest possible coding rate.

At step [212], the one or more base stations of the second set of base stations [102E, 102F] determines at least one aggressor cell based on a mismatch of the at least one received subframe and the at least one expected subframe. For instance, the one or more base stations of the second set of base stations [102E, 102F] may determine that since the carrier frequencies of aggressor and victim cells are not identical, at least one base station of the first set of base stations [102A, 102B, 102C, 102D] is identified as an aggressor cell based on the mismatch of carrier frequencies of aggressor and victim cells.

In an alternate instance, the present invention encompasses that at least one orthogonal channel noise sequence (OCNS) is received in the downlink pilot time slot of the at least one special subframe from the one or more base stations of the first set of base stations [102A, 102B, 102C, 102D]. In this regard, the method [200] encompasses calculating, at the one or more base stations of the second set of base stations [102E, 102F], a received signal strength indicator (RSSI) for the at least one received orthogonal channel noise sequence. Next, the method [200] comprises comparing, at the one or more base stations of the second set of base stations [102E, 102F], the calculated RSSI to a floor signal strength indicator for each of the at least one of the plurality of base stations. Furthermore, the one or more base stations of the second set of base stations [102E, 102F] maps the one or more base stations of the second set of base stations [102E, 102F] against each of the at least one of the one or more base stations of the first set of base stations [102A, 102B, 102C, 102D] based on the comparison. Lastly, the one or more base stations of the second set of base stations [102E, 102F] identifies the at least one base station of the one or more base stations of the first set of base stations [102A, 102B, 102C, 102D] as at least one aggressor cell based on the mapping.

Further to the above instance, the present invention encompasses that the floor signal strength indicator is determined during a preparation period, wherein the preparation period is indicative of a time period before receiving of the at least one subframe at the one or more base stations of the second set of base stations [102E, 102F]. For instance, as also shown in FIG. 4, the present invention encompasses a preparatory period [404] of minimum 15 minutes where in the one or more base stations of the first set of base stations [102A, 102B, 102C, 102D] may operate in DwPTS blanking mode. The RSSI measurements in the one or more base stations of the second set of base stations [102E, 102F] measured during the 15 minutes duration shall be considered as the "floor" value (pre-value or expected value) of interference which may be caused by one or more base stations of the first set of base stations [102A, 102B, 102C, 102D]. In order to ensure the floor value is more reliable, the present invention encompasses minimizing the intra circle interference during the measurement period, and that the one or more base stations of the second set of base stations [102E, 102F] implement DwPTS blanking mode in first special subframe during this period.

In yet another instance, the present invention encompasses that at least one constant amplitude zero auto correlation (CAZAC) sequence is received in the downlink pilot time slot of the at least one received downlink subframe from the at least one of the first set of base stations [102A, 102B, 102C, 102D], wherein the CAZAC sequence is pre-mapped to a cell identifier of the at least one of the plurality of base stations. In this regard, the method [200] encompasses decoding, at the one or more base stations of the second set of base stations [102E, 102F], the at least one received CAZAC sequence to identify the at least one of the plurality of base stations associated with the cell identifier. Next, the method [200] comprises calculating, at the one or more base stations of the second set of base stations [102E, 102F], a received signal strength indicator (RSSI) for the at least one received CAZAC sequence based on the cell identifier of the at least one base station of the first set of base stations [102A, 102B, 102C, 102D]. Lastly, the method comprises identifying, at the one or more base stations of the second set of base stations [102E, 102F], the at least one base station of the first set of base stations [102A, 102B, 102C, 102D] as at least one aggressor cell based on the calculation.

For instance, the one or more base stations of the second set of base stations [102E, 102F] are configured to decode the CAZAC sequence mapping to the known ECGI and measure the signal strength to assess the extent of interference from respective one or more base stations of the first set of base stations [102A, 102B, 102C, 102D]. Since the CAZAC sequences are orthogonal, all the one or more base stations of the first set of base stations [102A, 102B, 102C, 102D] shall perform simultaneous transmission without causing interference at one or more base stations of the second set of base stations [102E, 102F]. The receiver at the one or more base stations of the second set of base stations [102E, 102F] can decode various sequences and identify the ECGIs of dominant one or more base stations of the first set of base stations [102A, 102B, 102C, 102D] within a period of 1 ms. However, as the number of available resource elements in a symbol depends on DL Bandwidth, the present invention encompasses that the length of the CAZAC sequence is restricted because of which the transmission can be scheduled batch wise. For instance, in 10 MHz there are 600 sub-carriers out of which if 500 sub-carriers can be used for CAZAC sequences, only 500 cells can simultaneously transmit.

The method [200] of the present invention further encompasses reporting, by the one or more base stations of the second set of base stations [102E, 102F], the at least one aggressor cell to a system manager [103] connected to the wireless communication network. Next, the system manager pushes the at least one aggressor cell information to each of the plurality of base stations [102A, 102B, 102C, 102D, 102E, 102F]. The method [200] is completed at step [214].

Figure 3:
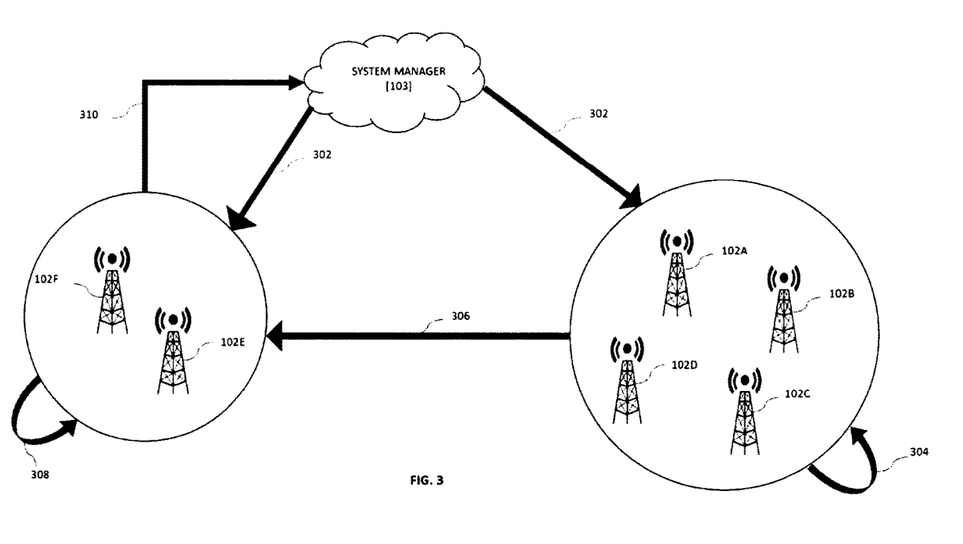
FIG. 3 illustrates an exemplary signal flow diagram for identifying at least one aggressor cell, in accordance with exemplary embodiments of the present invention.

Referring to FIG. 3, illustrates an exemplary signal flow diagram for identifying at least one aggressor cell, in accordance with exemplary embodiments of the present invention. In an instance of the present invention, at step [302], a system manager transmits an ECGI information relating to the one or more one or more base stations of the first set of base stations [102A, 102B, 102C, 102D] in the DwPTS symbols of the first special subframe in a round robin manner. Simultaneously, at step [302], the one or more base stations of the second set of base stations [102E, 102F] start the method for detection of aggressor cells the second special subframe and the third special subframe.

Next, at step [304], since the transmission will be repeated across all 10 DwPTS Downlink symbols with symbol number incrementing in every symbol from 1 to 10, the present invention encompasses that no user equipment shall be scheduled in downlink in this special sub-frame (SF 1) during the said transmission. Further, at step [306], the one or more base stations of the first set of base stations [102A, 102B, 102C, 102D] transmit the synchronization signals, the ECGI information and a symbol payload via a first special subframe.

Accordingly, at step [308], the present invention encompasses that no user equipment shall be scheduled in uplink in the special sub-frame (SF 1) and the next uplink subframe (SF 2) the one or more base stations of the second set of base stations [102E, 102F]. Further, at step [308], the one or more base stations of the second set of base stations [102E, 102F] are configured to synchronize with the aggressor cell and decode the ECGI information and the symbol payload of the one or more one or more base stations of the first set of base stations [102A, 102B, 102C, 102D] to determine at least one aggressor cell and the level of interference for such aggressor cell using the method of the present invention.

In another instance of the present invention, at step [306], the one or more base stations of the first set of base stations [102A, 102B, 102C, 102D] transmit an OCNS sequence in the DwPTS of the first special subframe. Accordingly, at step [308], the one or more base stations of the second set of base stations [102E, 102F] are configured to measure the signal strength for the OCNS sequence to identify the aggressor cell using the method of the present invention. In yet another instance of the present invention, at step 306, the one or more base stations of the first set of base stations [102A, 102B, 102C, 102D] transmit a CAZAC sequence pre-mapped to the ECGI in the first special subframe. Accordingly, at step [308], the one or more base stations of the second set of base stations [102E, 102F] are configured to identify the ECGI from the CAZAC sequence and to further identify at least one aggressor cell using the method of the present invention.

The one or more base stations of the second set of base stations [102E, 102F] are also configured to maintain a list of aggressor cells, and dynamically sort the list based on the RSSI of the aggressor cells. Lastly, at step 310, the one or more base stations of the second set of base stations [102E, 102F] are configured to report the aggressor cells to a systems manager [103]. The systems manager [103], in turn, pushes the aggressor cell information to each of the plurality of base stations [102A, 102B, 102C, 102D, 102E, 102F] connected to the wireless network.

Thus, the present invention provides a novel solution for the technical problem of identifying aggressor cell. Particularly, the solution of the present invention provides technical effect of transmission of unique ECGI information of the aggressor cells to all the victim cells, wherein the ECGI is encoded as either payload with additional synchronization signal for time synchronization or, as an orthogonal CAZAC sequence. The present invention is particularly useful as it ensure no service downtime, as in this process, it will be using first SSF for sequence transmission and first UL sub frame to detect known sequence or to measure RSSI and IOT, while the second SSF and second UL can still be used for services in every radio frame.

Although the present disclosure has been described with reference to certain preferred embodiments and examples thereof, other embodiments and equivalents are possible. Even though numerous characteristics and advantages of the present disclosure have been set forth in the foregoing description, together with functional and procedural details, the disclosure is illustrative only, and changes may be made in detail, within the principles of the disclosure to the full extent indicated by the broad general meaning of the terms. Thus, various modifications are possible of the presently disclosed system and process without deviating from the intended scope and spirit of the present disclosure.

We claim:

1. A method for identifying at least one aggressor cell from a plurality of base stations connected to each other over a wireless communication network, said plurality of base stations comprising a first set of base stations and a second set of base stations, operating on time division duplexing (TDD), said method comprising:
    transmitting at least one subframe from the first set of base stations to the second set of base stations, wherein
        the at least one subframe is transmitted by at least one base station of the first set of base stations,
        the at least one subframe further comprises of at least one downlink subframe, at least one uplink subframe and at least one special subframe, and
        the at least one special subframe further comprises of a downlink pilot time slot, an uplink pilot time slot and a guard period, wherein at least one orthogonal channel noise sequence (OCNS) is transmitted in the downlink pilot time slot of the at least one special subframe from the first set of base stations;
    receiving the at least one subframe at the second set of base stations from the first set of base stations, wherein
        the at least one subframe is received by at least one base station of the second set of base stations;
    decoding, at the second set of base stations, each of the at least one received downlink subframe, the at least one received uplink subframe and the at least one received special subframe of the at least one received subframe;
    mapping, at the second set of base stations, each of the at least one received downlink subframe, the at least one received uplink subframe and the at least one received special subframe of the at least one received subframe to at least one expected subframe; and
    determining, at the second set of base stations, at least one aggressor cell based on a mismatch of the at least one received subframe and the at least one expected subframe.

2. The method as claimed in claim 1, wherein the second set of base stations determine the at least one of the base stations of the first set of base stations as the at least one aggressor cell in an event the downlink pilot time slot of the at least one received special subframe is received at the uplink pilot time slot of the at least one expected special subframe.

3. The method as claimed in claim 1, wherein the at least one special subframe comprises one of a first synchronization signal, a second synchronization signal, an E-UTRAN Cell Global Identifier (ECGI) and a symbol number.

4. The method as claimed in claim 3, wherein the method further comprises decoding the downlink pilot time slot of the at least one received special subframe to identify the at least one base station of the first set of base stations associated with the ECGI.

5. The method as claimed in claim 1, further comprising measuring, at the second set of base stations, an interference level for each of the at least one received subframe based on a mismatch of the at least one received special subframe and the at least one expected special subframe.

6. The method as claimed in claim 1, wherein the downlink pilot time slot of the at least one special subframe comprises E-UTRAN Cell Global Identifier (ECGI) for at least one base station of the first set of base stations.

7. The method as claimed in claim 1, further comprising:
calculating, at the second set of base stations, a received signal strength indicator (RSSI) for the at least one received orthogonal channel noise sequence;
comparing, at the second set of base stations, the calculated RSSI to a floor signal strength indicator for each of the at least one of the plurality of base stations;
mapping, at the second set of base stations, the second set of base stations against the first set of base stations based on the comparison; and
identifying at least one of the base station of the first set of base stations as at least one aggressor cell based on the mapping.

8. The method as claimed in claim 7, wherein the floor signal strength indicator is determined during a preparation period, wherein
the preparation period is indicative of a time period before receiving of the at least one subframe at the second set of base stations, and
the first set of base stations are operating in a downlink pilot time slot blanking mode.

9. The method as claimed in claim 7, wherein the at least one base station of the first set of base stations is identified as the at least one aggressor cell based on a number of base stations of the second set of base stations affected by the at least one base station of the first set of base stations.

10. The method as claimed in claim 1, wherein at least one constant amplitude zero auto correlation (CAZAC) sequence is received in the downlink pilot time slot of the at least one received downlink subframe from the at least one of the first set of base stations, wherein the CAZAC sequence is pre-mapped to a cell identifier of the at least one of the plurality of base stations.

11. The method as claimed in claim 10, further comprising:
decoding, at the second set of base stations, the at least one received CAZAC sequence to identify the at least one of the plurality of base stations associated with the cell identifier;
calculating, at the second set of base stations, a received signal strength indicator (RSSI) for the at least one received CAZAC sequence based on the cell identifier of the at least one of the first set of base stations; and
identifying, at the second set of base stations, the at least one of the first set of base stations as at least one aggressor cell based on the calculation.

12. The method as claimed in claim 1, further comprising:
reporting, by the second set of base stations, the at least one aggressor cell to a system manager connected to the wireless communication network; and
pushing, by the system manager, the at least one aggressor cell information to each of the first set of base stations.

13. A system for identifying at least one aggressor cell from a plurality of base stations connected to each other over a wireless communication network, said plurality of base stations comprising a first set of base stations and a second set of base stations, operating on time division duplexing (TDD), said system comprising:
the first set of base stations configured to:
transmit at least one subframe, wherein
the at least one subframe is transmitted by at least one base station of the first set of base stations,
the at least one subframe further comprises of at least one downlink subframe, at least uplink subframe and at least one special subframe, and
the at least one special subframe further comprises of a downlink pilot time slot, an uplink pilot time slot and a guard period, wherein at least one orthogonal channel noise sequence (OCNS) is transmitted in the downlink pilot time slot of the at least one special subframe from the first set of base stations;
the second set of base stations connected to the first set of base stations, said second set of base stations configured to:
receive the at least one subframe, wherein the at least one subframe is received by at least one base station of the second set of base stations;
decode each of the at least one received downlink subframe, the at least one received uplink subframe and the at least one received special subframe of the at least one received subframe;
map each of the at least one received downlink subframe, the at least one received uplink subframe and the at least one received special subframe of the at least one received subframe to at least one expected subframe; and
determine at least one aggressor cell based on a mismatch of the at least one received subframe and the at least one expected subframe.

14. A base station connected to a plurality of other base stations, said base station comprising:
a memory unit;
a processor connected to the said memory unit, said processor configured to:
receive, at least one another subframe, from the plurality of other base stations, wherein
the at least one subframe further comprises of at least one downlink subframe, at least uplink subframe and at least one special subframe, and
the at least one special subframe further comprises of a downlink pilot time slot, an uplink pilot time slot and a guard period, wherein at least one orthogonal channel noise sequence (OCNS) is received in the downlink pilot time slot of the at least one special subframe from the first set of base stations;
decode each of the at least one received downlink subframe, the at least one received uplink subframe and the at least one received special subframe of the at least one received subframe;
map each of the at least one received downlink subframe, the at least one received uplink subframe and the at least one received special subframe of the at least one received subframe to at least one expected subframe; and
determine at least one aggressor cell based on a mismatch of the at least one received subframe and the at least one expected subframe.

15. The base station as comprised in claim 14, wherein the processor is further configured to transmit, to the plurality of other base stations, at least one another subframe.

* * * * *